US012764376B2

(12) United States Patent
Hsiao

(10) Patent No.: US 12,764,376 B2
(45) **Date of Patent: *Oct. 13, 2026**

(54) USING EXTRA SPACE ON ULTRA HIGH DEFINITION DISPLAY PRESENTING HIGH DEFINITION VIDEO

(71) Applicant: SATURN LICENSING LLC, New York, NY (US)

(72) Inventor: Eric Hsiao, San Diego, CA (US)

(73) Assignee: SATURN LICENSING, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,524

(22) Filed: Jan. 31, 2023

(65) Prior Publication Data

US 2023/0247252 A1 Aug. 3, 2023

Related U.S. Application Data

(63) Continuation of application No. 15/492,362, filed on Apr. 20, 2017, now Pat. No. 11,601,709, which is a (Continued)

(51) Int. Cl.
*H04N 21/435* (2011.01)
*H04N 5/45* (2011.01)
(Continued)

(52) U.S. Cl.
CPC ............. *H04N 21/435* (2013.01); *H04N 5/45* (2013.01); *H04N 21/4316* (2013.01); *H04N 21/4341* (2013.01); *H04N 21/4347* (2013.01); *H04N 21/4348* (2013.01); *H04N 21/440263* (2013.01); *H04N 21/4622* (2013.01); *H04N 21/47* (2013.01); *H04N 21/4858* (2013.01);
(Continued)

(58) Field of Classification Search
CPC .... H04N 21/435; H04N 5/45; H04N 21/4316; H04N 21/4341; H04N 21/4347; H04N 21/4348; H04N 21/440263; H04N 21/4622; H04N 21/47; H04N 21/4858; H04N 21/812; H04N 21/8126; H04N 7/0125; H04N 21/4886
See application file for complete search history.

(56) References Cited

U.S. PATENT DOCUMENTS 9,668,015 B2 * 5/2017 Hsiao ................. H04N 21/4858
11,601,709 B2 * 3/2023 Hsiao ................. H04N 21/4858
(Continued)

FOREIGN PATENT DOCUMENTS

CN 1976429 B 1/2012
JP 2008294693 12/2008

OTHER PUBLICATIONS

C. Fehn, P. Kauff, O. Schreer, R. Schaefer, "Interactive Virtual View Video for Immersive TV Applications", Pennsylvania State University CiteSeer Archives, Jul. 26, 2001.

*Primary Examiner* — Michael Lee
(74) *Attorney, Agent, or Firm* — Richard LaPeruta

(57) ABSTRACT

A UHD display presents HD video in the native resolution of HD, leaving some portions of the UHD display unused for presenting the HD video. Ancillary information received, for example, in real time with the HD video or in parallel with the HD video over the Internet is presented in the unused portions of the UHD display along with the HD video.

20 Claims, 3 Drawing Sheets logic flow (2)

Related U.S. Application Data continuation of application No. 13/687,375, filed on Nov. 28, 2012, now Pat. No. 9,668,015.

(51) Int. Cl.

| | |
|---|---|
| ***H04N 7/01*** | (2006.01) |
| ***H04N 21/431*** | (2011.01) |
| ***H04N 21/434*** | (2011.01) |
| ***H04N 21/4402*** | (2011.01) |
| ***H04N 21/462*** | (2011.01) |
| ***H04N 21/47*** | (2011.01) |
| ***H04N 21/485*** | (2011.01) |
| ***H04N 21/488*** | (2011.01) |
| ***H04N 21/81*** | (2011.01) |

(52) U.S. Cl.

CPC ....... *H04N 21/812* (2013.01); *H04N 21/8126* (2013.01); *H04N 7/0125* (2013.01); *H04N 21/4886* (2013.01)

(56) References Cited

U.S. PATENT DOCUMENTS

| | | | | |
|---|---|---|---|---|
| 2008/0120668 | A1* | 5/2008 | Yau | H04N 21/4316 348/E5.002 |
| 2008/0143877 | A1 | 6/2008 | Urabe et al. | |
| 2009/0310016 | A1 | 12/2009 | Fukuda et al. | |
| 2010/0319020 | A1 | 12/2010 | Yuen et al. | |
| 2011/0058101 | A1 | 3/2011 | Earley et al. | |
| 2011/0058102 | A1 | 3/2011 | Nishimura | |
| 2011/0187925 | A1 | 8/2011 | Onoda | |
| 2011/0255002 | A1 | 10/2011 | Witheiler | |
| 2013/0002833 | A1 | 1/2013 | Card | |
| 2014/0168277 | A1* | 6/2014 | Ashley | G09G 5/14 345/672 |
| 2015/0124888 | A1* | 5/2015 | Hwang | H04N 21/6336 375/240.26 |
| 2015/0139614 | A1* | 5/2015 | Choi | H04N 21/47205 386/284 |
| 2015/0229878 | A1* | 8/2015 | Hwang | H04N 21/234363 348/446 |

* cited by examiner

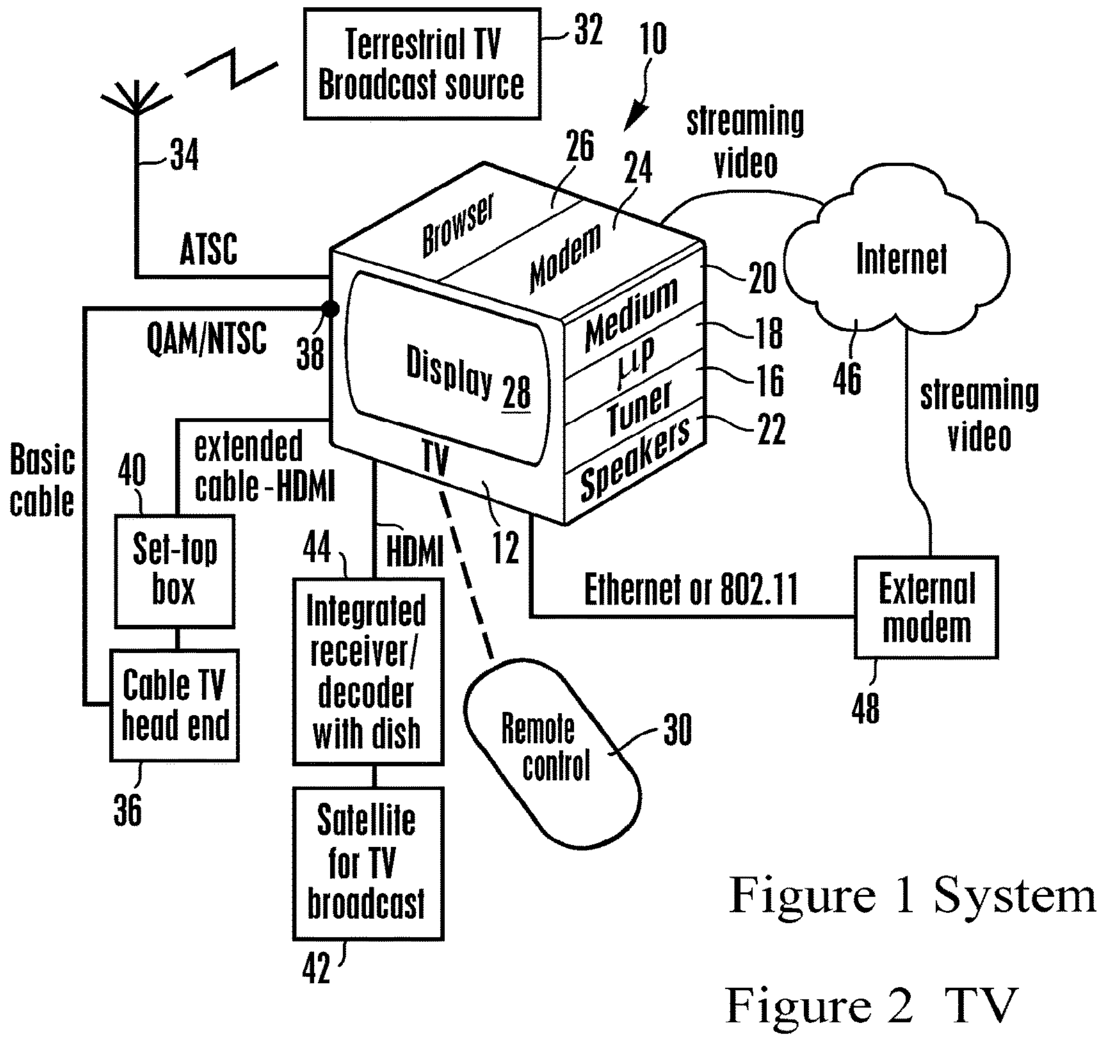
Figure 1 System
Figure 2 TV
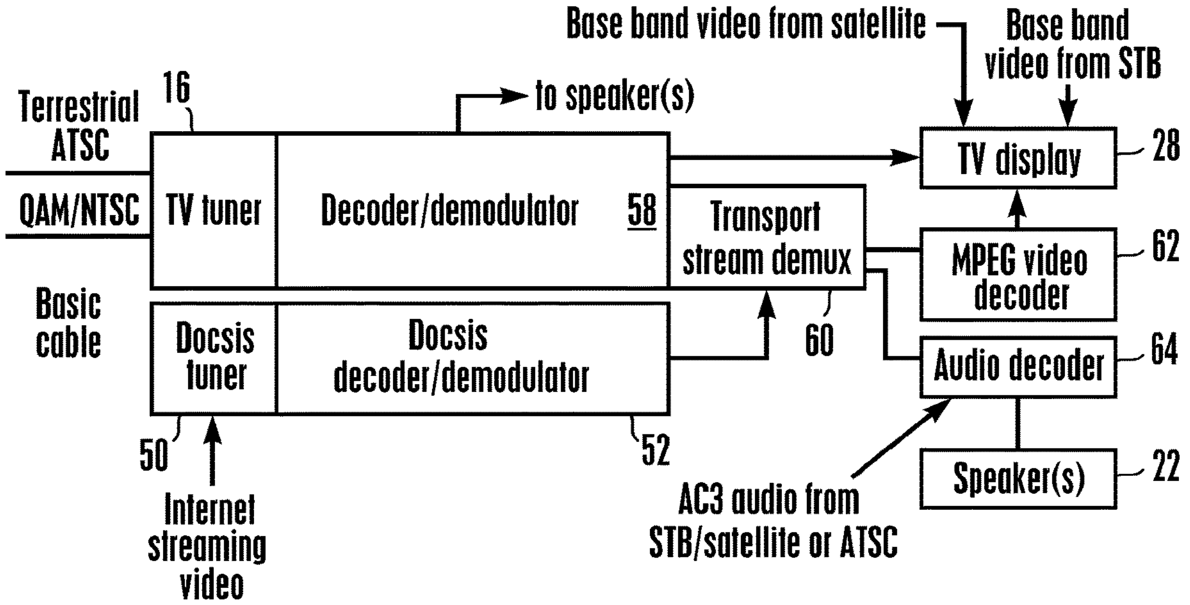

user interface giving user choice to upscale or data structure for HD with ancillary information logic flow (1)

Figure 6 logic flow (2)
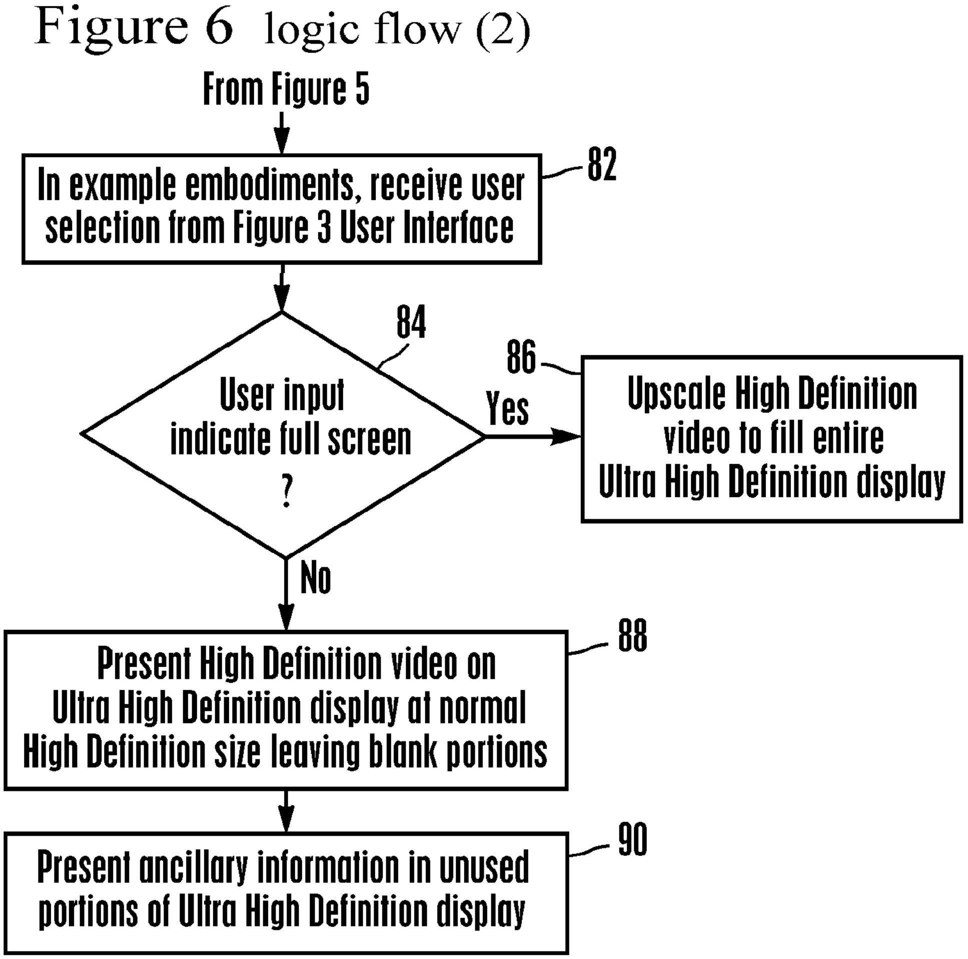
Figure 7
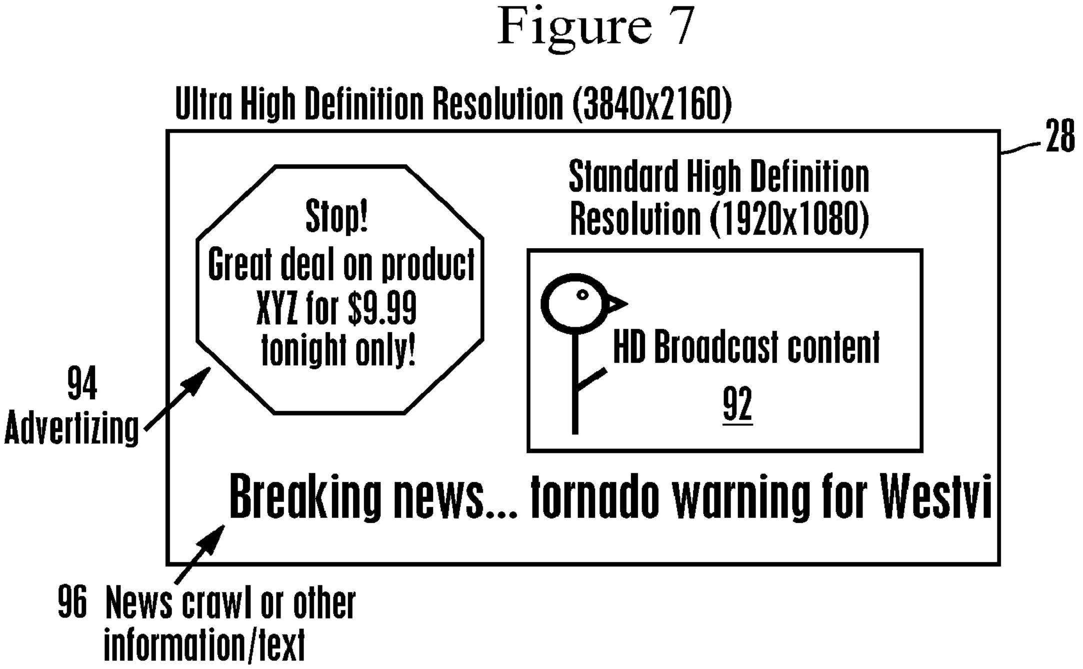

USING EXTRA SPACE ON ULTRA HIGH DEFINITION DISPLAY PRESENTING HIGH DEFINITION VIDEO

CROSS-REFERENCE TO RELATED APPLICATION

The present application is a continuation application of U.S. patent application Ser. No. 15/492,362, filed Apr. 20, 2017, which is a continuation application of U.S. patent application Ser. No. 13/687,375, filed Nov. 28, 2012, which issued as U.S. Pat. No. 9,668,015 on May 30, 2017, the disclosures of which are incorporated by reference herein.

FIELD

The present application relates generally to using extra space on ultra high definition (UHD) displays when the UHD displays present high definition (HD) video.

BACKGROUND

High Definition (HD) displays have been introduced which have greater resolution than standard definition (SD) displays. This is achieved by increasing the pixel density from the standard 640 or 720 pixels per line, with 480 lines (720×480), to the HD 1920×1080 (for progressive and interlaced scans) 1440×1080 (for older interlaced scans). The greater resolution produces a clearer, more detailed visual presentation.

Recently, ultra high definition (UHD) displays have been introduced with even greater resolution than HD. As understood herein, owing to the paucity of programming available for UHD, current UHD displays present HD video which is simply upscaled to fill the entire display. This approximation to true UHD, however, may undesirably cause image artifacts to appear. As understood herein, there are more advantageous ways to exploit the improved capability of UHD displays.

SUMMARY OF THE INVENTION

An assembly includes an ultra high definition (UHD) display configured for presenting video in 2160 pixel lines or 4320 pixel lines and a processor configured for controlling the UHD display. The assembly also includes a computer readable storage medium bearing instructions executable by the processor to: present high definition (HD) video on the UHD display using at least 1440 of the pixel lines, wherein portions of the display do not present HD video when HD video is being presented elsewhere on the display. In addition, the instructions are executable by the processor to present ancillary information in the portions of the display that do not present HD video. The ancillary information is receivable from a source of TV signals or from the Internet in real time with the HD video.

The processor when executing the instructions presents the HD video may use at least 1920 lines of the UHD display. The ancillary information can be received from the source of TV signals along with the HD video in a common channel with the HD video or it may be received from the Internet.

A user input device can be configured for communicating with the processor to input first and second user commands. The first user command may be to present the HD video on the entire UHD display by upscaling the HD video and the second user command may be to present the HD video on a portion of the UHD display and to present on the UHD display the ancillary information along with the HD video. The ancillary information can be configured for being ignored by non-UHD assemblies.

In another aspect, a method includes receiving, at an ultra high definition (UHD) display characterized by a first resolution, high definition (HD) video characterized by a second resolution less than the first resolution. The method also includes presenting the HD video on the UHD display without upscaling the HD video to fill the entire UHD display to thereby render portions of the UHD display that do not present the HD video. Furthermore, the method includes presenting ancillary information in the portions of the UHD display that do not present the HD video.

In another aspect, an ultra high definition (UHD) display device includes a UHD display configured for presenting non-UHD video in a native resolution of the non-UHD video, leaving some portions of the UHD display unused for presenting non-UHD video to establish unused display portions. A processor is included in the UHD display device and is configured for controlling the UHD display to present demanded images. The processor is configured for causing ancillary information received in real time with the non-UHD video or in parallel with the non-UHD video over the Internet to be presented in the unused display portions of the UHD display along with the non-UHD video.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a block diagram of an example TV;

FIG. 6 is a flow chart of additional example logic; and

FIG. 7 is a screen shot of a UHD display presenting HD video in native HD video resolution and presenting ancillary information in unused portions of the UHD display.

DETAILED DESCRIPTION OF THE PREFERRED EMBODIMENT

Figure 3:
FIG. 3 is a screen shot of an example user interface (UI) that can be presented on the UHD display to allow a user to enable upscaling of video such as SD or HD video to fill the UHD display or to present the video in its native resolution, filling in unused display areas with ancillary information.

Referring initially to the non-limiting example embodiment show in FIG. 1, a system 10 includes an audio video device such as a TV 12 including a TV tuner 16 communicating with a TV processor 18 accessing a tangible computer readable storage medium 20 such as disk-based or solid state storage. The TV 12 can output audio on one or more speakers 22. The TV 12 can receive streaming video from the Internet using a built-in wired or wireless modem 24 communicating with the processor 12 which may execute a software-implemented browser 26. Video is presented under control of the TV processor 18 on a TV display 28 which according to present principles is an ultra high definition (UHD) display such as a flat panel display. The display 28 may be a 2160 p (progressive scan) display with a resolution of 3840×2160 pixels (for 4K UHD) or 4320 p (progressive scan) display with a resolution of 7860×4320 pixels (for 8K UHD). Frame rates for the UHD display 28 can be 24, 25, 50, 60, or 120 frames per second.

User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the TV 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV.

Similarly, HDMI baseband signals transmitted from a satellite source 42 of TV broadcast signals received by an integrated receiver/decoder (IRD) 44 associated with a home satellite dish may be input to the TV 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the TV 12 and conveyed to the TV 12 over a wired or wireless Ethernet link and received at an RJ45 or 802.11x antenna on the TV chassis.

FIG. 2 shows details of an example TV 12. As shown, the terrestrial signal in ATSC format is input to the TV tuner 16, as is basic cable in NTSC or QAM format in the event that basic cable is used and the wall cable plugged into the F-type connector 38. On the other hand, streaming Internet video may be received at a DOCSIS tuner 50 and demodulated/decoded at a DOCSIS decoder/demodulator 52. Typically, the DOCSIS components are housed separately from the TV 12 but in some embodiments may be included in the chassis of the TV 12.

The output of the tuner 16, depending on the signal format received, may be sent to an appropriate decoder/demodulator 58 the output of which typically is sent to a transport stream demultiplexer 60, which separates the desired program from other programs in the selected stream and sends the desired program to an MPEG video decoder 62, which in turn uncompresses the MPEG desired program and sends the uncompressed program to the TV display 28 for presentation. Audio from the demultiplexer 60 may be sent to an audio decoder 64 which in turn sends the decoded audio to the speakers 22 for presentation.

In contrast to the sequence of decoder/demodulators, demultiplexer, and MPEG decoders discussed above, video from either the STB 40 or IRD 44 is in baseband HDMI when it is received by the TV 12. Accordingly, the signals from the STB 40 or IRD 44 are sent directly to the TV display 28 for presentation without further video decompression between the STB 40 or IRD 44 and TV display 28. Audio from the STB 40 or IRD 44 may still be in a format, e.g., AC3, that requires decoding prior to play on the speakers 22 so the audio may be sent through the audio decoder 64 as shown. Likewise, audio from the ATSC terrestrial source 32 may be in AC3 format and so may be sent through the audio decoder 64. Internet video from the DOCSIS decoder/demodulator 52 may be sent through the demultiplexer 60 and decoders 62, 64 as shown.

Now referring to FIG. 3, an example user interface is shown on the UHD display 28. In the case of the TV 12 receiving HD data from any source described above, the user may select (using the remote control 30) a first user command 66 to upscale the HD video and fill the UHD display 28 with the HD video. Upscaling matches the pixel count of the HD video to the greater pixel count of the UHD display by, e.g., interpolating two adjacent pixel values in the HD and inserting an extra pixel between them with the interpolated value. The user can alternatively select a second user command 68 and present ancillary information rather than upscaling the HD video to fill the display 28. In this case, the processor 18 can present the HD video on the UHD display 28 using at least 1440 of the pixel lines, leaving portions of the display 28 unused. The processor 18 may present ancillary information in the unused portions of the display 28. The ancillary information can be received from a source of TV signals or from the Internet 46 in real time with the HD video.

Figure 4:
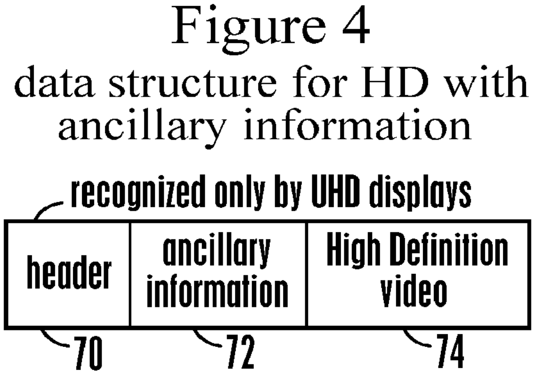
FIG. 4 is a schematic diagram of an example data structure the header of which is readable by UHD displays but not by HD displays.

Moving in reference to FIG. 4, the data structure for HD video with ancillary information is illustrated. A header 70 is attached to ancillary information 72 and HD video 74 and is recognized only by UHD displays. Examples of ancillary information 72 can be, but are not limited to, statistics for sporting events, additional advertising such as a sponsor's logo, interactive games while watching game shows, etc. The broadcast TV source 32 may send HD video 74 with the header 70 and consequently cause the processor 18 to prompt the user of the UHD display 28 with the UI in FIG. 3.

Figure 5:
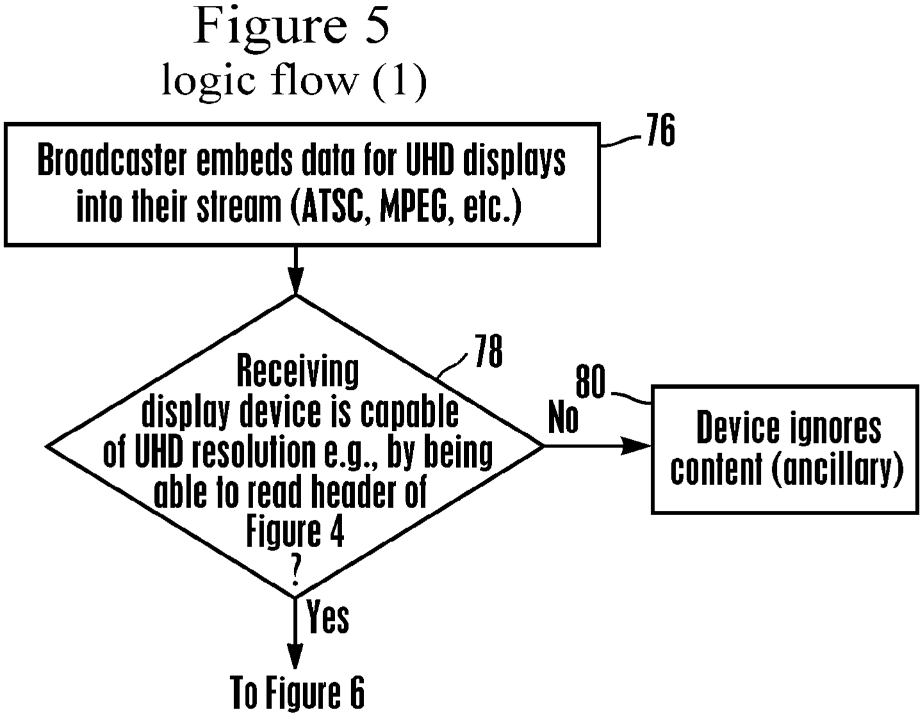
FIG. 5 is a flow chart of example logic.

FIG. 5 diagrams a first flow of logic beginning at block 76, wherein the broadcast TV source 32 may embed ancillary data for UHD displays into their stream (ATSC, MPEG, etc). It is determined at decision diamond 78 whether the receiving display device 12 is capable of UHD resolution. In one example this can be done by determining whether the processor 18 is able to read the header 70 of FIG. 4. If the display device 12 is not capable of UHD resolution, and therefore does not recognize the header 70, the device 12 ignores the ancillary content 72 at block 80. Alternatively, if the display device 12 is capable of UHD resolution, and therefore recognizes the header 70, the flow of logic moves to FIG. 6.

The second flow of logic in FIG. 6 begins at block 82, wherein the processor 18 receives the user selection from the user interface in FIG. 3. If the user input indicates full screen presentation of video at decision diamond 84, the HD video undergoes upscaling to fill the entire UHD display 28 at block 86. A user input indicating less than full screen presentation moves logic to block 88, at which point the HD video is presented on the UHD display 28 at normal HD size, leaving blank portions of the display 28. Ancillary information is presented in real time along with the broadcasted content in unused portions of the display 28 at block 90.

Ancillary information is not limited to content sent by the broadcaster. The ancillary information displayed at block 90 may come in the form of Internet browsing or an interactive application. Or, the ancillary information may come from intermediaries such as a business who wants to showcase their own products. In an example embodiment, a sports bar carrying live games can display their menu or drink specials in real time around the HD broadcast.

The screen shot in FIG. 7 illustrates some examples of creative uses of unused portions of the display 28. HD broadcast content 92 is presented in standard HD size and clearly does not fill the entire display 28 but rather just a portion. In this embodiment, an advertisement 94 and a news crawl or other information/text 96 are displayed on the unused portions of the display 28.

A standard can be developed specifically for UHD displays to interpret data from a MPEG2 or MPEG4/AVC stream that allows it to use the extra resolution space. This can also be applied to Blu-ray discs or online video streaming services as well. This allows it to maintain backwards compatibility with existing 1920×1080 displays which would simply ignore the UHD related data.

While the particular USING EXTRA SPACE ON ULTRA HIGH DEFINITION DISPLAY PRESENTING HIGH DEFINITION VIDEO is herein shown and described in detail, it is to be understood that the subject matter which is encompassed by the present invention is limited only by the claims. For example, present principles may be incorporated into a smart phone such that various behavior as would be reflected by a recognized sound would trigger recording into the phone as a "life log".

What is claimed is:

1. An ultra high definition (UHD) display device comprising:

a UHD display configured for presenting non-UHD video in a native resolution of the non-UHD video, leaving some display portions of the UHD display unused;

a processor configured for controlling the UHD display to present the non-UHD video, the processor configured for receiving ancillary information in real time with the non-UHD video or in parallel with the non-UHD video over the Internet, and for presenting, based on the ancillary information, information in the unused display portions of the UHD display along with the non-UHD video, the processor configured to receive a data structure along with the non-UHD video and to present on the UHD display, in response to at least one data element recognized only by UHD displays and being other than the ancillary information in the data structure attached to the non-UHD video, an interface allowing a user to select between presenting the non-UHD video full screen and presenting the non-UHD video partial screen along with the information based on the ancillary information.

2. The device of claim 1, wherein the device comprises receiving one or more terrestrial TV broadcast signals by a terrestrial TV broadcast antenna.

3. The device of claim 1, wherein the device comprises receiving HDMI baseband signal from a source of TV broadcast signals received by an integrated receiver/decoder (IRD).

4. The device of claim 1, wherein the device comprises receiving a streaming video over a wired or wireless link at RJ45 or 802.11x antenna.

5. The device of claim 1, wherein the data structure is attached to the ancillary information.

6. The device of claim 1, wherein the data structure is attached to the ancillary information and the data structure is a header.

7. The device of claim 1, wherein the ancillary information is embedded in the non-UHD video that is carried in an ATSC stream.

8. The device of claim 1, wherein the ancillary information is embedded in the non-UHD video that is carried in an MPEG stream.

9. The device of claim 1, wherein the ancillary information is in the form of an interactive application.

10. The device of claim 1, wherein the ancillary information is received from a source of TV signals along with the non-UHD video in a common channel with the non-UHD video.

11. The device of claim 1, comprising a user input device configured for communicating with the processor to input first and second user commands, the first user command being to present the non-UHD video on the entire UHD display by upscaling the non-UHD video, the second user command being to present the non-UHD video on a portion of the UHD display and to present on the UHD display the ancillary information along with the non-UHD video.

12. The device of claim 1, wherein when executing instructions by the processor that are borne by a computer readable storage medium, the UHD display presents non-UHD video using at least 1920 lines of the UHD display.

13. The device of claim 1, wherein the information in the unused display portions of the UHD display along with the non-UHD video are presented in at least two separate locations.

14. The device of claim 1, wherein two pieces of the information in the unused display portions of the UHD display along with the non-UHD video are presented apart and separate from one another.

15. An ultra high definition (UHD) display device comprising:

a UHD display configured for presenting non-UHD video in a native resolution of the non-UHD video, leaving some display portions of the UHD display unused;

a processor configured for controlling the UHD display to present the non-UHD video, the processor configured for receiving ancillary information in real time with the non-UHD video or in parallel with the non-UHD video over the Internet, and for presenting, based on the ancillary information, information in the unused display portions of the UHD display along with the non-UHD video;

the processor configured to receive, along with the non-UHD video, a data structure that includes at least one data element recognized only by UHD displays and other than the ancillary information, the data element when recognized causing the processor to present an interface on the UHD display, the interface allowing a user to select between presenting the non-UHD video full screen and presenting the non-UHD video partial screen along with the information based on the ancillary information.

16. The device of claim 15, wherein the ancillary information comprises internet browsing information.

17. The device of claim 15, wherein the ancillary information is at least one of statistics for sporting events, advertising subject matter, and interactive gaming subject matter.

18. An ultra high definition (UHD) display device comprising:

a UHD display configured for presenting non-UHD video in a native resolution of the non-UHD video, leaving some display portions of the UHD display unused;

a processor configured for controlling the UHD display to present the non-UHD video, the processor configured for receiving ancillary information in real time with the non-UHD video or in parallel with the non-UHD video over the Internet, and for presenting, based on the ancillary information, information in the unused display portions of the UHD display along with the non-UHD video, the processor configured to receive, along with the non-UHD video, a data structure that includes a header recognized only by UHD displays, the header including a data element other than the ancillary information, the data element when recognized causes the processor to present an interface on the UHD display, the interface allowing a user to select between presenting the non-UHD video full screen and presenting the non-UHD video partial screen along with the information based on the ancillary information.

19. The device of claim 18, wherein the ancillary information comprises internet browsing information.

20. The device of claim 18, wherein the ancillary information is at least one of statistics for sporting events, advertising subject matter, and interactive gaming subject matter.

* * * * *